(12) United States Patent
Peeters et al.

(10) Patent No.: US 11,977,637 B2
(45) Date of Patent: May 7, 2024

(54) TECHNIQUE FOR AUTHENTICATION AND PREREQUISITE CHECKS FOR SOFTWARE UPDATES

(71) Applicant: TEXAS INSTRUMENTS INCORPORATED, Dallas, TX (US)

(72) Inventors: Eric Thierry Jean Peeters, Frisco, TX (US); Barak Cherches, Ramat Ha'Kovesh (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 320 days.

(21) Appl. No.: 16/515,918

(22) Filed: Jul. 18, 2019

(65) Prior Publication Data

US 2021/0019418 A1  Jan. 21, 2021

(51) Int. Cl.
   G06F 21/57  (2013.01)
   G06F 8/65   (2018.01)
   H04L 9/30   (2006.01)
   H04L 9/32   (2006.01)

(52) U.S. Cl.
   CPC .............. G06F 21/572 (2013.01); G06F 8/65 (2013.01); H04L 9/30 (2013.01); H04L 9/3242 (2013.01); H04L 9/3247 (2013.01); *G06F 2221/033* (2013.01)

(58) Field of Classification Search
   CPC .... G06F 21/572; G06F 8/65; G06F 2221/033; G06F 21/57; H04L 9/30; H04L 9/3242; H04L 9/3247
   See application file for complete search history.

(56) References Cited

U.S. PATENT DOCUMENTS

| 2002/0077094 A1* | 6/2002 | Leppanen | H04L 67/303 455/420 |
| 2006/0265590 A1* | 11/2006 | DeYoung | H04L 9/3247 713/176 |
| 2009/0070361 A1* | 3/2009 | Haber | G06F 21/6254 707/999.102 |

(Continued)

OTHER PUBLICATIONS

Wikipedia, Elliptic Curve Digital Signature Algorithm, Jun. 10, 2018 revision. (Year: 2018).*

(Continued)

*Primary Examiner* — Robert B Leung
*Assistant Examiner* — Howard H. Louie
(74) *Attorney, Agent, or Firm* — Mandy Barsilai Fernandez; Frank D. Cimino (57) ABSTRACT

Techniques related to a technique comprising dividing an update into a number of portions, generating, for the first portion, a first portion hash value, generating, for the second portion, a second portion hash value, generating a first branch hash value comprising a hash of a concatenation of the first portion hash value and the second portion hash value, generating a root hash value by concatenating the first branch hash value and a second branch hash value, generating a signature based on the root hash value and a private key, generating an update header comprising the signature, the root hash value, and a hash tree comprising first and second portion hash values, the first branch hash value, and the root hash value, transmitting the update header to a client device for authentication, and transmitting one or more of the number of portions to the client device.

26 Claims, 4 Drawing Sheets

(56) References Cited

U.S. PATENT DOCUMENTS

| | | | | |
|---|---|---|---|---|
| 2013/0013931 A1* | 1/2013 | O'Hare | ............... | H04L 9/085 |
| | | | | 713/189 |
| 2016/0057189 A1* | 2/2016 | Mosko | ............... | H04L 67/10 |
| | | | | 709/219 |
| 2017/0357496 A1* | 12/2017 | Smith | ............... | H04L 9/3228 |
| 2019/0149338 A1* | 5/2019 | Byrne | ............... | G06F 21/64 |
| | | | | 713/177 |

OTHER PUBLICATIONS

Haplin, Harry. "Updatechain: Using Merkle Trees for Software Updates." May 11, 2016. Available at: https://courses.csail.mit.edu/6.857/2016/files/28.pdf.

* cited by examiner

TECHNIQUE FOR AUTHENTICATION AND PREREQUISITE CHECKS FOR SOFTWARE UPDATES

BACKGROUND

Generally, a device capable of being connected to the internet, referred to herein as a connected device, is obtained by a user with a shipped software version pre-installed on the device. In many cases, after the shipped software is released, additional changes to enhance or add features, fix bug, address security issues, etc. may be made as software updates to the shipped software. Software updates allow connected devices to adapt to an ever-changing environment by allowing the software running on the connected device to evolve with the environment rather than remaining fixed at the time of release.

Traditionally, a connected device is updated by first downloading and assembling a complete software update package in a memory area. The software update package as a whole is then authenticated, for example, by verifying a signature associated with the software update package. The software update package is then copied to a memory location from which to apply the software update package. The connected device may then reboot into a mode, such as an update mode, whereby normal operations are suspended and the software update applied, such as by flashing the software update package. The connected device may then reboot and run the updated software. This type of upgrade typically requires a relatively large amount of temporary memory storage, at least as large enough download the software update package and extract software package and then another memory location from which to apply the software update from. In certain cases, it is desirable to have a software update process which minimizes the amount of memory, network resources, and processing power needed to store and apply software updates.

SUMMARY

This disclosure relates to updating software. More particularly, but not by way of limitation, aspects of the present disclosure relates to methods for updating software by dividing an update into a number of portions, generating, for the first portion, a first portion hash value, generating, for the second portion, a second portion hash value, generating a first branch hash value comprising a hash of a concatenation of the first portion hash value and the second portion hash value, generating a root hash value by concatenating the first branch hash value and a second branch hash value, generating a signature based on the root hash value and a private key, generating an update header comprising the signature, the root hash value, and a hash tree comprising first and second portion hash values, the first branch hash value, and the root hash value, transmitting the update header to a client device for authentication, and transmitting one or more of the number of portions to the client device.

Another aspect of the present disclosure relates to methods of updating software by receiving, by a client device, an update header, the update header comprising a signature, a root hash value, and a hash tree containing portion hash values for each portion of a number of portions of an update, authenticating the update header based on the signature and a public key, receiving a first portion of number of portions of the update, authenticating the first portion based on a comparison of a hash value of the first portion and the portion hash values in the hash tree, saving the first portion to a memory location, repeating the steps of receiving the portion, authenticating the portion, and saving the portion until a determination that the update has been received, and updating software on the client device based on the received update.

Another aspect of the present disclosure relates to a connected device comprising a memory, a network interface, and one or more processors operatively coupled to the memory, wherein the one or more processors are configured to execute non-transitory instructions causing the one or more processors to receive an update header, the update header comprising a signature, a root hash value, and a hash tree containing portion hash values for each portion of a number of portions of an update, authenticate the header based on the signature and a public key, receive a first portion of number of portions of the update, authenticate the first portion based on a comparison of a hash value of the first portion and the portion hash values in the hash tree, save the first portion to a memory location, repeat the steps of receiving the portion, authenticating the portion, and saving the portion until a determination that the update has been received, and update software on the client device based on the received update.

It may be understood that while techniques herein are discussed in the context of low-power connected devices, nothing in this disclosure is meant to limit these techniques to such devices. Rather, the techniques discussed herein are readily applicable across a broad range of connected devices, including, but not limited to handheld devices, embedded devices, remote sensors, point-of-sale devices, personal computers, laptops, wearable devices, etc.

BRIEF DESCRIPTION OF THE DRAWINGS

For a detailed description of various examples, reference will now be made to the accompanying drawings in which.

DETAILED DESCRIPTION

Certain connected devices have limited amounts of memory, limited power budget, or other constraints which make updating in the traditional fashion challenging. For example, a connected device such as a low power or Internet of things (IoT) device, may be powered by a battery, remotely located and expected to operate for months or years on a single charge. Such a device may have very limited processing power, memory capacities, and network throughput.

These limits can make updating the software and/or firmware on such devices challenging. For example, redownloading the entire software update package due to a small corrupted portion can be an expensive operation in terms of power needed for the network connection, processing time, and downtime for the connected device. Similarly, increased amounts of memory can increase power consumption and/or manufacturing costs and reducing an amount of memory required to download, authenticate, and apply a software update may be desirable.

Figure 1:
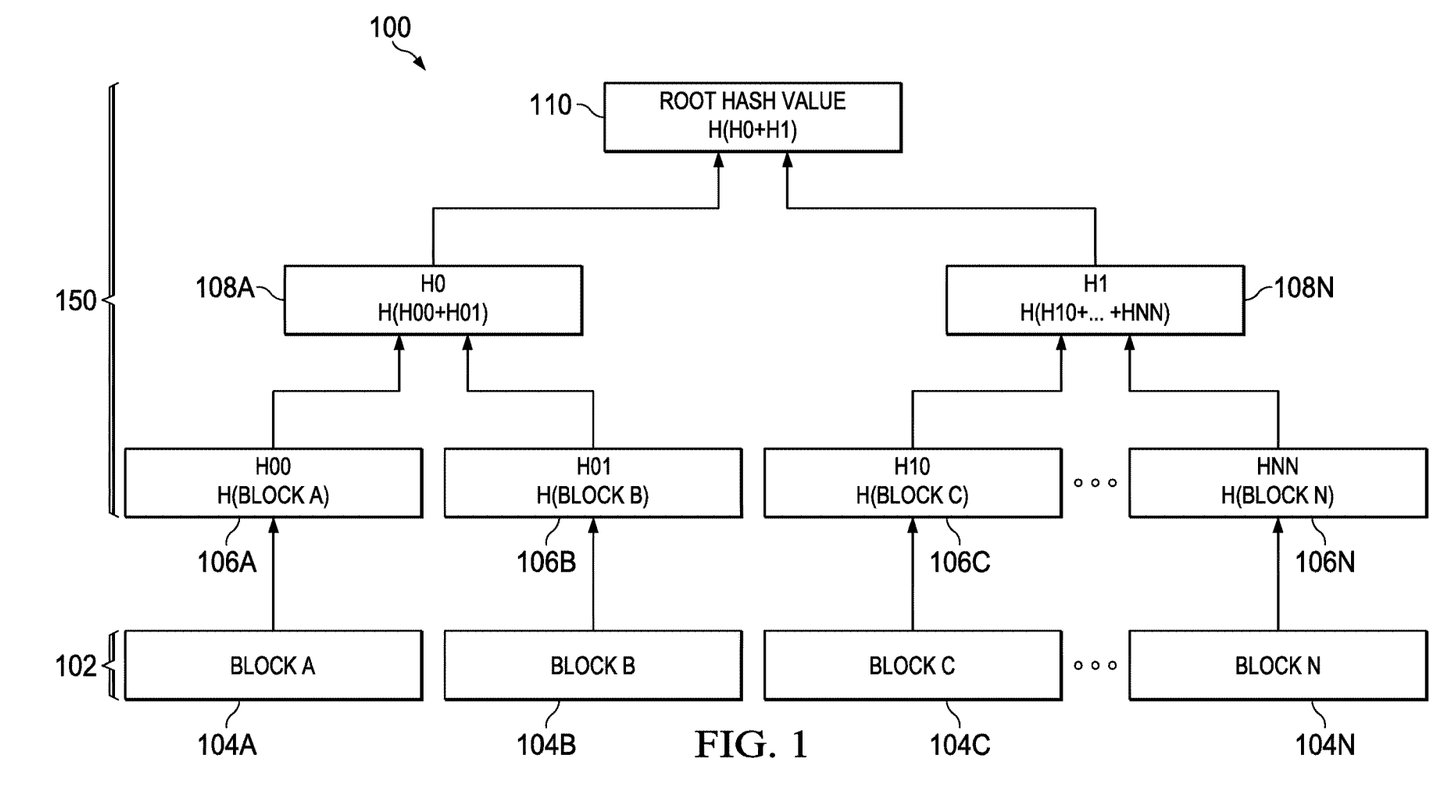
FIG. 1 is a block diagram of a technique for software updates, in accordance with aspects of the present disclosure.

FIG. 1 is a block diagram of a technique for software updates 100, in accordance with aspects of the present disclosure, Software updates, at a fundamental level, are a set of bits. This set of bits may be referred to as a software update package. In certain cases, the software update package may be compressed. The software update package may be subdivided into one or more files, or a binary blob. This update package 102 may be split into two or more blocks 104A-104N (collectively 104). According to certain aspects, these two or more blocks 104 may be based on a target block size. In certain cases, this target block size may be predetermined and fixed. The exact block size may be a design choice and based on, for example, ease of hashing, target over network packet size, smallest flash programmable sector size, or other design consideration. In cases where an update package includes one or more files, splitting the update package into blocks 104 based on the block size may result in files spanning multiple blocks. Alternatively, blocks may be based on files within the software update package.

After the blocks 104 are determined, each block may be hashed by applying a hash function to bits of update package in each block. The hash values (expressed as H00-HNN) generated by hashing each block may be inserted into a hash tree 150 as leaf nodes 106A-106N (collectively 106). The hashing may be performed by any cryptographic hashing technique. As used herein, hashing or a hash may be understood to refer to cryptographic hashing or a cryptographic hash. For example, the bits of block A 104A may be hashed, expressed as H(block A), into a hash value H00, using a cryptographic hash function such as Secure Hash Algorithm (SHA) 2. This hash value H00, may then be inserted in a leaf node 106A into a hash tree 150. Similarly, bits of other blocks 104B-104N may be hashed into respective hash values (H01-HNN) and inserted into respective leaf nodes 106B-106N.

Once the leaf nodes 106A-106N have been created, two or more leaf nodes 106 may be concatenated and hashed again. It should be noted that while the present embodiment concatenates leaf node hashes, in other embodiments, other operations, such as a join or subtraction operation, may be utilized as well. While most implementations are likely to be binary hash trees with two leaf nodes, it may be understood that trees with more than two leaf nodes are consistent with this disclosure. Hash values H0 and H1 (expressed as H0-HN) from hashing two or more leaf nodes 106 may then be inserted into the hash tree 150 as branch nodes 108A-108N (collectively 108). For example, hash values H00 and H01 for leaf nodes 106A and 1668, respectively, may be concatenated. This concatenation may be expressed as H00+H01. The concatenated hash values H00+H01 is then hashed (expressed as H(H00+H01)) to obtain hash value H0. This hash value H0 is then inserted into branch node 108A.

Additional higher-level branch nodes (not shown) may be constructed from hashes of two or more lower branch nodes as needed based on a number of blocks 104 used to divide the update package 102 and a number of leaf nodes 104 incorporated into each branch node 106, and a number of branch nodes 106 incorporated into each higher branch node (not shown).

In certain cases, each branch node may include a hash value made from the concatenation of two hashes from two lower-level nodes (e.g., leaf or a lower-level branch node). In other cases, each branch node may include a hash value made from the concatenation of more than two hashes from lower-level nodes. The number of hashes from lower-level nodes used to build a higher branch node may be predefined and this number may be a target number where not all higher-level branch nodes includes the target number of lower-level nodes. For example, a number of blocks, and hence leaf nodes, may not divide evenly by the target number, resulting in not all higher-level branch nodes including the target number of lower-level nodes.

Higher branch nodes may be incorporated into even higher-level branch nodes until the branch nodes are incorporated into a highest level root node 110, The root node 110 includes a hash value of a concatenation of the hash values of the branch values immediately below the root node 110. In the current example where each higher-level branch node is built using two lower-level nodes, hash values H0 and H1 of branch nodes 108A and 108N, respectively, are concatenated and hashed, expressed as H(H0+H1) to form a root hash value, which is inserted into as the root node 110 of the hash tree 150. It should be noted that while this example is shown as a two level binary tree (not including the root level) for binary hash trees, such as hash tree 150, the depth of the binary hash tree is rounded_down(log 2(n)), where n is the number of leaf nodes (and thus hash values), and other examples of hash tree 150 are expected to include more than two levels. As the hash tree 150 effectively includes of a set of linked hashes which describe, but do not contain, the software update itself, the hash tree 150 can be much smaller than the software update itself. In certain cases, nodes of the hash tree 150 may be based on hash values of nodes from other hash trees. That is, the hash tree 150 may include hashes from sub-hash trees, which may allow portions of a software update to be prepared separately and then combined. In certain cases, the hash tree 150 may be sent to the connected device that will be applying the software update to help verify and authenticate the software update.

Figure 2:
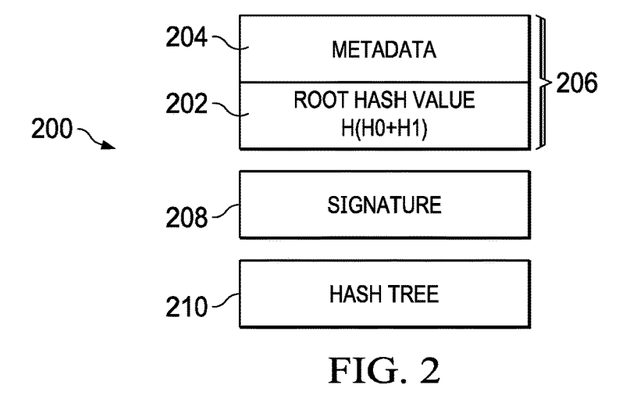
FIG. 2 is a block diagram of an update header, in accordance with aspects of the present disclosure.

FIG. 2 is a block diagram of an update header 200, in accordance with aspects of the present disclosure. After a root hash value 202 is obtained, metadata 204 related to the software update, such as versioning information, file digest, total number of blocks, additional branch hash values, etc., may be combined with the root hash value 202 and signed with signature 208 to obtain signed data 206. This signature 208 may be generated based on any signature algorithm. As an example, the signature 208 may be based on an elliptic curve digital signature algorithm (ECDSA) and a private key for the party creating the software update. The signature 208 and signed data 206 may be combined with hash tree 210 into the header 200. The header 200 may be transmitted to the connected device, either along with or separate from the software update itself. In cases where the header 200 is sent separate from the software update itself, it is advantageous, but not required, to send the header 200 in a way likely to lead to the header 200 being received before the software update. For example, the header 200 may be transmitted before the software update as information in the header may be used to help increase efficiency when processing the software update.

The signature 208, along with the root hash value 202, allows each block of the entire update to be authenticated without having to sign each block. Generally, verifying a signature is a relatively resource intensive process as compared to hashing. Once the root hash value is authenticated by verifying the signature 208 and root hash value 202 included in the signed data 206, any block can then be verified by hashing the block and comparing the hash value of the block to the hash tree. Generally, in the case the hash tree is a binary hash tree, proving the hash value of the block is a member of the hash tree without determining the entire hash tree takes log 2 (total number of blocks in the software update) hashes. In certain cases, for example assuming the hash tree shown in FIG. 2 does not include any additional blocks, block B 104B of FIG. 1 may be authenticated using two hash values, the leaf hash value H00 from leaf node 106A and the branch hash value H1 from branch node 108N. In this example, leaf hash value H00 and H1 may be obtained from the hashes of the nodes in the hash tree 210, and the root hash value may be obtained from the header 200. Block B 104B may then be hashed to obtain leaf hash value H01. Leaf hash value H00 may be concatenated with leaf hash value H01 and hashed to obtain branch hash value H0. Branch hash value H0 may be concatenated with branch hash value H1 and hashed to obtain a calculated root hash value. The calculated root hash value may then be compared to the root hash value 202 from the header 200 to authenticate block B 104B.

In certain other cases, the connected device may, after authenticating the header, verify the hash tree received 210 by concatenating leaf nodes together, hashing them and comparing with the value of the parent node hash. By processing each layer the same way, the connected device can recompute the root hash value. The recomputed root hash value may be compared to the received root hash value 202. If the recomputed root hash value and received root hash value 202 match, and the signature for the received root hash value 202 verified via signature verification and the user public key, the received hash tree 210 may be deemed authentic by the connected device. A received block of the software update may be hashed and the resulting computed block hash value compared to the block hash values of the hash tree 210 to authenticate the received block of the software update. Similarly, in certain cases, the hash tree 210 may be omitted from the header 200 and verifying the software update can be performed by obtaining the software update, splitting the software update into blocks, hashing the blocks to compute the hash tree along with the root hash value. This recomputed root hash value may be compared to the received, signature verified, root hash value 202.

In certain cases, portions of the software update may be skipped. For example, portion hash values from the software update may be compared against a hash of corresponding memory ranges of a current version of the software in memory for matches. Download of portions having matching hash values may be skipped or not requested.

In certain cases, comparing portion hash values from the hash tree 210 may be used to verify compatibility, prerequisite, or other conditions of the connected device. For example, certain portions of the software update may correspond to a reference portion of the software on the connected device and/or relatively fixed values, such as hardwired values or fixed identifiers. The connected device may validate that hash values of the respective portion of the software update matches the hash values of these certain portions of the current version of the software and when matches are found, proceed to download the software update.

Figure 3:
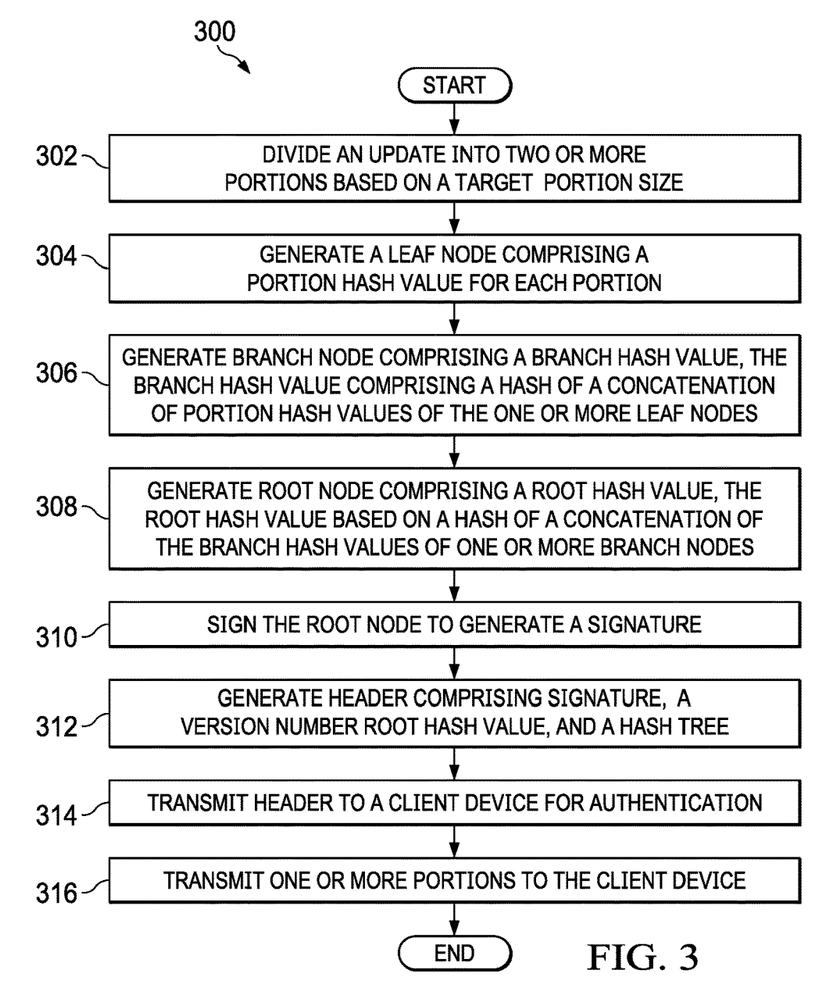
FIG. 3 is a flow diagram illustrating a technique for updating software, in accordance with aspects of the present disclosure.

FIG. 3 is a flow diagram 300 illustrating a technique for updating software, in accordance with aspects of the present disclosure. At block 302, an update may be divided into two or more portions based on a target portion size. For example, a software update in the form of a binary package may be divided into two or more portions of a certain size. In certain cases, the last portion may be smaller than the certain size. At block 304, the contents of each portion may be hashed to generate a leaf node with the portion hash value for each portion. For example, the binary of each portion may be hashed using a cryptographic hashing algorithm such as SHA-2 or SHA-3 and this hash value result is stored as a leaf node. At block 306, a branch node may be generated. The branch node stores a branch hash value that is based on a hash of a concatenation of portion hash values for one or more leaf nodes. For example, the portion hash values of two leaf nodes may be concatenated together and then hashed to generate a branch hash value. In the case where there is a single leaf node, such as the last leaf node, that portion hash value may be hashed again to generate the branch hash value. Higher-level branch nodes may be generated based on a hash of a concatenation of branch hash values for one or more lower-level branch nodes. At block 308, a root node may be generated. The root node stores a root hash value that is based on a hash of a concatenation of branch hash values of one or more branch nodes. At block 310, the root node may be signed to generate a signature. For example, a signature may be generated based on the root node hash value and a private key for a party creating the software update using ECDSA. In certain cases, the signature may also be generated based on a set of metadata as well as the root hash value and private key. This signature may be appended/prepended to the root node hash value. At block 312, a header for the update is generated including the root node hash value, the signature, and, optionally, the hash tree comprising the first and second portion hash values, the first branch hash value, and the root hash value. It may be understood that the header as used herein is related to the software update and should not be confused with a packet header. The header may be transmitted in the payload portion of any communication packet, such as an internee protocol (IP) packet. At block 314, the header is transmitted to a client device for authentication. At block 316, one or more portions of the update are transmitted to the client device.

Figure 4:
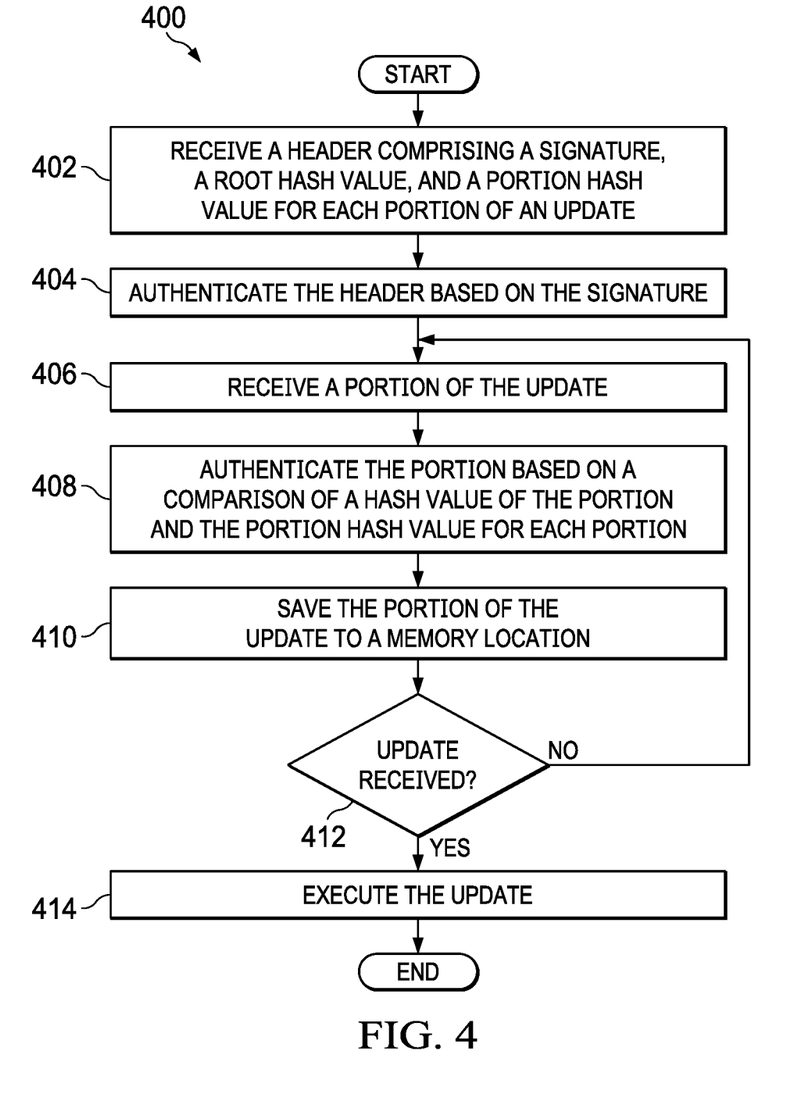
FIG. 4 is a flow diagram illustrating a technique for applying a software update, in accordance with aspects of the present disclosure.

FIG. 4 is a flow diagram 400 illustrating a technique for applying a software update, in accordance with aspects of the present disclosure. At block 402, a client device, receives an update header. The header includes a signature, a root hash value, a hash tree for an update, and, optionally, metadata related to the update. For example, a connected device receives, over a network connection a header for a software update. This header may be received from a server associated with the party creating the software update. Alternatively, the header may be received from a third party. At block 404, the header is authenticated based on the signature. For example, the connected device may perform a public key signature verification on the signature and root hash value using a public key associated with the party creating the software update to verify that the root hash value is valid. At block 406, one or ore portions of the update may be received by the client device. For example, the connected device may receive portions of the software update, via a network connection, from the party creating the software update or a third party.

At block 408, the one or more portions of the software update are authenticated based on a comparison of a hash value of the one or more portions and the portion hash values for each portion. For example, as discussed above, the one or more portions of the software update may be received along with metadata including one or more branch hash values and the one or more portions may be authenticated without first determining the entire hash tree. As another example, the hash tree may be verified based on the signed root hash value and the hash tree included in the header. Hash value of the one or more portions may then be compared to the hash values in the hash tree.

At block 410, the portions of the update are saved to a memory location. For example, the connected device may download one or more portions to a temporary memory location. After a particular portion is downloaded, and optionally before all portions are downloaded, that particular portion may be authenticated as described in block 408. This authentication may be performed by, for example, a software updater, such as a bootloader. In certain cases, the particular portion may be written to a memory location accessible by the software updater, such as the bootloader, on the connected device. This helps allow the size of the temporary memory location to be reduced, potentially well below the size of entire software update. In certain cases, the temporary memory location may be sized based on the target block size, but should be at least as big as the target block size.

At block 412, the steps of receiving portions, authenticating portions, and saving the portions are repeated until all portions of the update have been programmed into flash (or any type of non-volatile memory). At block 414, the client device executes the update. For example, the software updater updates the connected device with the software update.

According to certain aspects, partial updates may also be performed. For example, the current software may be divided into two or more portions based on a target portion size and the two or more portions hashed to obtain current portion hash values. The current software may refer to, for example, the version of the software in memory and/or running on the connected device. As an example, memory ranges based on the in-memory version of the software may be determined and these memory ranges may be hashed to obtain the current portion hash values.

After receiving the header, the hash tree in the header may verified and authenticated against the signed root node of the header by recalculating the hash tree from the portion hash values in the header and reconstructing a root node hash value. This reconstructed root node hash value may then be compared to the root node hash value in the header to validate the hash tree in the header. The portion hash values in the header may be compared to the current portion hash values to determine if there are any matches. For example, the header may also include an indication that only a certain portion or a defined number of portions need to be updated. The current portions hash values may be compared against portion hash values in the hash tree to verify, for example, that the indicated certain portions have different hash values and are thus different from the respective current portions, and/or that portions other than the indicated certain portions have portion hash values that match the respective current portion hash values. If the portions other than the indicated certain portions have matching hash values with the respective current portions, then updating the respective current may be skipped, for example, by not requesting portions other than the indicated certain portions, or not installing portions other than the indicated certain portions. Alternatively, current portion hash values may be concatenated with one or more portion hash values from the header to obtain computed branch hash values. These computed branch hash values may be compared to either branch hash values received in the metadata, or from the hash tree. If a match is found, then downloading of update portions corresponding to current portion hashes may be skipped by, for example, cancelling or not downloading such portions. For example, the connected device may just request update portions corresponding to those portions which are different from the current portion hashes.

Figure 5:
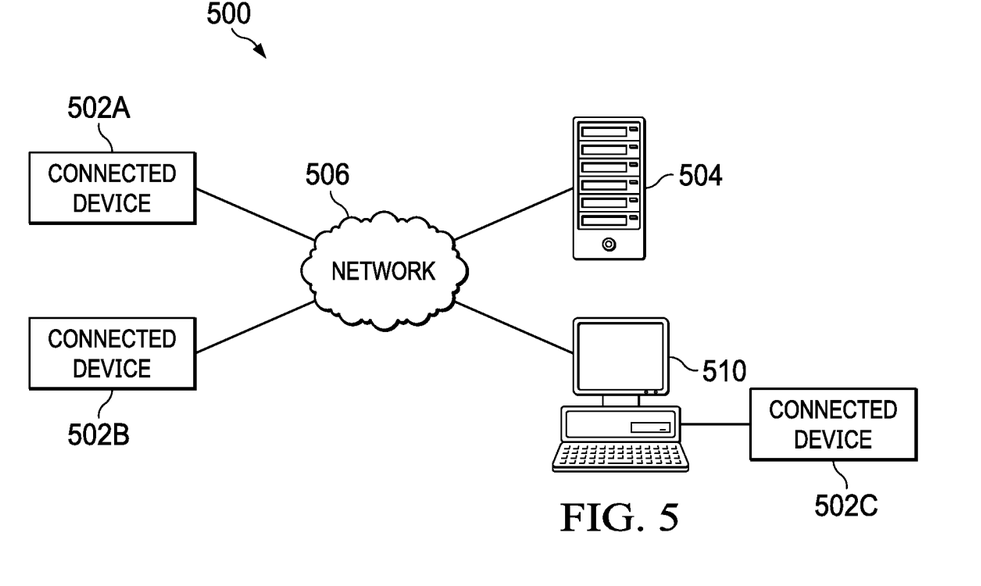
FIG. 5 is a schematic diagram of an embodiment of a computing system, in accordance with aspects of the present disclosure.

FIG. 5 is a schematic diagram of an embodiment of a computing system 500, where embodiments of the present disclosure may operate herein. Computing system 500 may Include connected devices 502A-502C (collectively 502), an update server 504, and network 506, such as the internee. In some embodiments, the update server 504 may be not be a single server, but one or more servers accessible via a single network address, such as a uniform resource locator (URL). In some cases, the update server 504 may be a list of alternative download sources, and may include third party servers. The URL may be utilized by an organization that distributes software updates. Although not specifically illustrated in FIG. 5, the update server 504 may also include one or more datacenters. The datacenters may include a plurality of server instances, where each server instance can be implemented on a physical computing system, such as a single electronic computing device (e.g., a single physical hardware server) or could be in the form a multi-computing device (e.g., multiple physical hardware servers). Server instances may be connected via one or more network devices (e.g., gateway or router) or a combination of devices to route or direct network traffic to an appropriate server.

The connected devices 502 may include, but is not limited to, an IoT device, a mobile device, such as a smartphone, tablet, etc., a personal computer, a wearable device, etc. Certain connected devices 502, such as connected device 502A and 502B are coupled to and able to communicate with the update server 504 via network 506. Certain connected devices 502C may be coupled to one or more other connected devices 502D and able to obtain updates via the one or more other connected devices 502D and network 506. The network 506 may include one or more computing networks available today, such as LANs, wide area networks (WAN), the Internet, and/or other remote networks. The network 506 may contain wired and/or wireless programmable devices that operate in the electrical and/or optical domain. For example, network 506 may include wired networks, such as ethernet, fiber optic connections, etc., wireless networks, such as cellular networks (e.g., Global System for Mobile Communications (GSM) based cellular network), wireless fidelity (WiFi®) (WIFI is a registered trademark owned by Wi-Fi Affiance Corporation)) networks, and/or other suitable radio based network as would be appreciated by one of ordinary skill in the art upon viewing this disclosure. The network 506 may also employ any number of network communication protocols, such as Transmission Control Protocol (TCP) and Internet Protocol (IP). Although not explicitly shown in FIG. 5, network 506 may include a variety of network devices, such as servers, routers, network switches, and/or other network hardware devices configured to transport data over networks.

Figure 6:
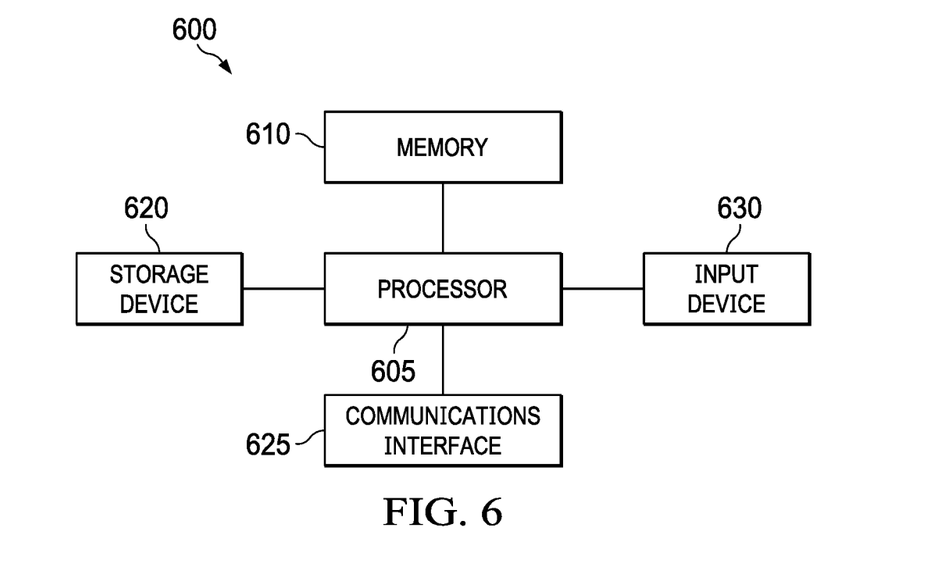
FIG. 6 is a block diagram of an embodiment of a connected device, in accordance with aspects of the present disclosure.

As illustrated in FIG. 6, connected device 600 includes a processing element such as processor 605 that contains one or more hardware processors, where each hardware processor may have a single or multiple processor cores. Examples of processors include, but are not limited to a central processing unit (CPU) or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory computer readable storage medium configured to store various types of data. For example, memory 610 may include one or more volatile devices such as random access memory (RAM). Non-volatile storage devices 620 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 620 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Storage 620 may be partitioned or split into multiple sections that may be accessed by different software programs. For example, storage 620 may include a section designated for specific purposes, such as storing program instructions or data for updating software of the computing device 600. In one embodiment, the software to be updated includes the ROM, or firmware, of the computing device. In certain cases, the computing device 600 may include multiple operating systems. For example, the computing device 600 may include a general-purpose operating system which is utilized for normal operations. The computing device 600 may also include another operating system, such as a bootloader, for performing specific tasks, such as upgrading and recovering the general-purpose operating system, and allowing access to the computing device 600 at a level generally not available through the general-purpose operating system. Both the general-purpose operating system and the another operating system may have access to the section of storage 620 designated for specific purposes.

Computing device 600 may also include one or more communications interfaces 625 which may be communicatively coupled to processor 605. The one or more communications interfaces may include a radio communications interface for interfacing with one or more radio communications devices. In certain cases, elements coupled to the processor may be included on hardware shared with the processor. For example, the communications interfaces 625, storage, 620, and memory 610 may be included, along with other elements such as the digital radio, in a single chip or package, such as in a system on a chip (SOC). Computing device 600 may also include an input device 630. Examples of an input device include sensors, cameras, and human input devices, such as mouse, keyboard, touchscreen, etc. Processed input may be output from the computing device 600 via the communications interfaces 625 to one or more other devices. In certain cases, the computing device 600 may also include an output device, not shown, for providing output, for example, to a user. Examples of the output device include a display screen, tactile or motion generators, speakers, lights, etc.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

In the drawings, like elements are denoted by like reference numerals for consistency.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A method, comprising:
    dividing an update into a plurality of portions, wherein the plurality of portions comprises at least a first portion and a second portion;
    generating, for the first portion, a first portion hash value;
    generating, for the second portion, a second portion hash value;
    generating a first branch hash value, the first branch hash value comprising a hash based on the first portion hash value and the second portion hash value;
    generating a root hash value, the root hash value comprising a hash based on the first branch hash value and a second branch hash value;
    generating a root signature based on the root hash value and a private key;
    transmitting the root signature, the root hash value, and a hash tree, as part of an update header, without transmitting an additional signature, wherein the hash tree comprises the first and second portion hash values, the first branch hash value, and the root hash value;
    transmitting the update header to a client device for authentication; and
    transmitting the first portion to the client device.

2. The method of claim 1,
    wherein a number of portions of the plurality of portions is based on a target portion size, and
    wherein the update comprises one or more binary files and wherein the target portion size comprises a fixed size.

3. The method of claim 1, further comprising:
    receiving a request to retransmit the first portion from the client device; and retransmitting the first portion without retransmitting any other unrequested portions to the client device.

4. The method of claim 1, wherein the root signature is generated based on the root hash value, versioning information, and metadata, and wherein the private key is associated with a published public key.

5. The method of claim 1, wherein transmitting the first portion to the client device comprises:
receiving a request to transmit the first portion from the client device; and
transmitting the first portion without transmitting any other unrequested portions to the client device.

6. The method of claim 5, wherein less than all of the plurality of portions are requested by the client device.

7. The method of claim 5, further comprising transmitting the second branch hash value to the client device.

8. A non-transitory program storage device comprising instructions stored thereon to cause one or more processors to:
receive, by a client device and from another device, a root signature, a root hash value, and a hash tree, as part of an update header, without receiving an additional signature from the another device, the hash tree containing portion hash values for each portion of a plurality of portions of an update, wherein the root signature is generated based on the root hash value;
authenticate the update header based on the root signature and a public key;
receive a first portion of the plurality of portions of the update;
authenticate the first portion based on a comparison of a hash value of the first portion and the portion hash values in the hash tree without using an additional signature;
save the first portion to a memory location;
repeat the steps of receiving a respective portion, authenticating the respective portion, and saving the respective portion until a determination that the update has been received; and
update software on the client device based on the received portions of the update.

9. The non-transitory program storage device of claim 8, wherein the instructions to authenticate the first portion further cause the one or more processors to:
generate a first branch hash value, the first branch hash value comprising a hash of a concatenation of a first portion hash value and a second portion hash value;
generate a reconstructed root hash value by concatenating the first branch hash value and a second branch hash value;
determine that the reconstructed root hash value is equal to the root hash value; and
determine that the hash value of the first portion matches a portion hash value of the hash tree.

10. The non-transitory program storage device of claim 9, wherein the update header further comprises the second branch hash value.

11. The non-transitory program storage device of claim 8, wherein a portion size of each portion of the plurality of portions is based on a fixed target portion size.

12. The non-transitory program storage device of claim 8, wherein the instructions further cause the one or more processors to:
obtain current portion hash values for each portion of software on the client device;
determine, based on a comparison between a first current portion hash value and a second portion hash values of a second portion for the update, that the second portion is the same as the first current portion hash value;
determine, based on a comparison between a second current portion hash value and a third portion hash values of a third portion for the update, that the third portion is different from the second current portion hash value;
send a request, to a server, for the third portion; and
determine that the update has been received without receiving the second portion.

13. The non-transitory program storage device of claim 8, wherein the instructions further cause the one or more processors to:
obtain a current second portion hash value for a current second portion of software on the client device; and
determine, based on a comparison between the current second portion hash value and hash values in the hash tree, that the current second portion does not need to be updated;
wherein updating software comprises updating the first portion without updating the current second portion based on the determination that the current second portion does not need to be updated.

14. The non-transitory program storage device of claim 8 wherein portions of the update are received in any order.

15. The non-transitory program storage device of claim 8, wherein the instructions further cause the one or more processors to:
obtain a current second portion hash value for a current second portion of software on the client device, the current second portion corresponding to a reference portion of the software on the client device;
determine, based on a comparison between the current second portion hash value and hash values in the hash tree, that the current second portion does not need to be updated; and
determine to update software on the client device based on the determination that the current second portion does not need to be updated.

16. An electronic device comprising:
a memory;
a network interface;
one or more processors operatively coupled to the memory, wherein the one or more processors are configured to execute non-transitory instructions causing the one or more processors to:
receive, from another device, a root signature, a root value, and a hash tree as part of an update header, without receiving an additional signature from the another device, the hash tree containing portion hash values for each portion of a plurality of portions of an update, wherein the root signature is generated based on the root hash value;
authenticate the update header based on the root signature and a public key;
receive a first portion of the plurality of portions of the update;
authenticate the first portion based on a comparison of a hash value of the first portion and the portion hash values in the hash tree, without using an additional signature; save the first portion to a memory location;
repeat the steps of receiving a respective portion, authenticating the respective portion, and saving the respective portion until a determination that the update has been received; and
update software on the electronic device based on the received portions of the update.

17. The electronic device of claim 16, wherein the instructions further cause the one or more processors to authenticate the first portion by:
- generating a first branch hash value, the first branch hash value comprising a hash of a concatenation of a first portion hash value and a second portion hash value;
- generating a reconstructed root hash value by concatenating the first branch hash value and a second branch hash value;
- determining that the reconstructed root hash value is equal to the root hash value; and
- determining that the hash value of the first portion matches a portion hash value of the portion hash values.

18. The electronic device of claim 17, wherein the update header further comprises the second branch hash value.

19. The electronic device of claim 16, wherein a portion size of each portion of the plurality of portions is based on a fixed target portion size.

20. The electronic device of claim 16, wherein the instructions further cause the one or more processors to:
- obtain current portion hash values for each portion of software on the electronic device;
- determine, based on a comparison between a first current portion hash value and a second portion hash values of a second portion for the update, that the second portion is the same as the first current portion hash value;
- determine, based on a comparison between a second current portion hash value and a third portion hash values of a third portion for the update, that the third portion is different from the second current portion hash value;
- send a request, to a server, for the third portion; and
- determine that the update has been received without receiving the second portion.

21. The method of claim 1, wherein the first branch hash value comprises a hash of a concatenation of the first portion hash value and the second portion hash value, and wherein the root hash value comprises a hash of a concatenation of the first branch hash value and the second branch hash value.

22. The method of claim 1, wherein generating the root signature comprises generating the root signature using an elliptic curve digital signature algorithm.

23. The method of claim 1, further comprising:
- receiving the update header, by the client device; and
- receiving the first portion, by the client device, wherein the client device authenticates the received first portion based on a hash of the received first portion, the hash tree, the root signature, and the root hash value, without using an additional signature.

24. The method of claim 23, further comprising:
- transmitting the second portion; and
- receiving the second portion, by the client device, wherein the client device authenticates the received second portion based on a hash of the received second portion, the hash tree, the root signature, and the root hash value, without using an additional signature.

25. The non-transitory program storage device of claim 8, wherein authenticating the update header based on the root signature and the public key comprises authenticating the update header based on the root signature and the public key using an elliptic curve digital signature algorithm.

26. The electronic device of claim 16, wherein authenticating the update header based on the root signature and the public key comprises authenticating the update header based on the root signature and a public key using an elliptic curve digital signature algorithm.

* * * * *